United States Patent Office 3,528,992
Patented Sept. 15, 1970

3,528,992
NAPHTHOXATHIOLES
Weldon M. Padgett II, 2728 Russell St., Berkeley, Calif. 94705, and Julius Hyman, 311 Pala Ave., Piedmont, Calif. 94611
No Drawing. Filed Oct. 28, 1965, Ser. No. 505,473
Int. Cl. C07d 89/06
U.S. Cl. 260—327       5 Claims

ABSTRACT OF THE DISCLOSURE

New chemical compounds having an unsubstituted oxathiole ring fused to a naphthalene nucleus, e.g. naphth [1,2-d][1,3]oxathiole and naphth[2,1-d]-1,3-oxathiole.

---

This invention relates to new chemical compounds which are synergists for organic insecticides, to synergistic insecticidal compositions containing the new compounds, and to methods for their use.

In our copending application, Ser. No. 409,937, filed Nov. 9, 1964, now abandoned claim was laid to certain unsubstituted dioxoles, specifically dioxoles fused to polycyclic aromatic hydrocarbon moieties such as naphthalene and phenanthrene, and their use as synergists in insecticidal compositions.

We have now found that potent dioxole-free insecticide synergists may be synthesized by fusing an unsubstituted oxathiole ring to a fully aromatic naphthalene nucleus. Indeed, it appears that the unsubstituted oxathiole ring is as effective as the unsubstituted dioxole ring in conferring synergistic activity to naphthalenic compounds. This discovery is of considerable economical importance in the light of the necessity for devising insecticidal formulations possessing low toxicity toward man and wildlife, because the presence of sulfur in the oxathiole ring assures ready detoxification by warm-blooded animals, and because the oxathiole system in the naphthalene series is readily realized both in beta-naphthol and those of its derivatives in which the alpha position adjacent to the hydroxyl is unsubstituted

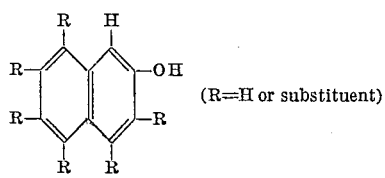
(R=H or substituent)

and in those alpha-naphthols in which the beta position adjacent to the free hydroxyl group is unsubstituted and for some reason more readily available to substitution than the para alpha position

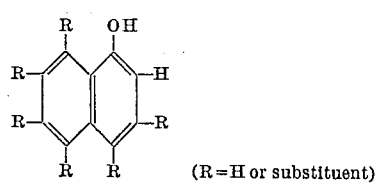
(R=H or substituent)

In the first of these cases, preferably by means of thiocyanation followed by ring closure, hydrolysis and methyl- enation, the resulting compound is a naphth[1,2-d]-1,3-oxathiole

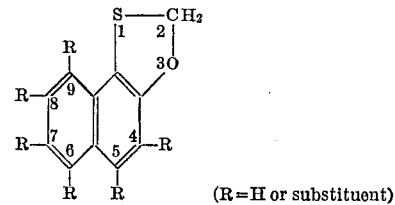
(R=H or substituent)

whereas in the latter case, using the same sequence of reactions, the resulting compound is a naphth[2,1-d]-1,3-oxathiole

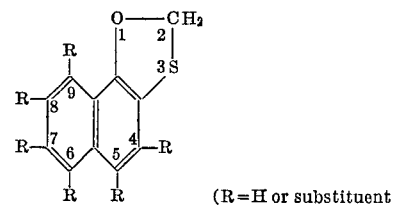
(R=H or substituent using Ring Index nomenclature.

The substituents of hydrogen for R on the naphthalene nucleus may be of the most varied sort, including but not limited to hydroxyl, alkoxy, poly-alkoxy, alkenoxy, alkyl, haloalkyl, halogen, nitro, carboxyl, carboalkoxyl and alkylcarboxamide. Especially important because of their effectiveness per unit cost are fully unsubstituted naphth-[1,2-d]-1,3-oxathiole

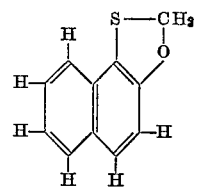

the esters and amides of 4-carboxynaphth[1,2-d]-1,3-oxathiole

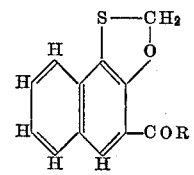

the ethers and esters of 7- and 8-hydroxynaphth[1,2-d]-1,3-oxathiole

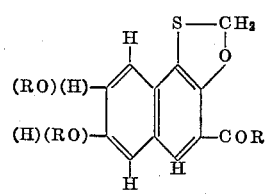

and the ethers and esters of 5- and 6-hydroxynaphth[2,1-d]-1,3-oxathiole

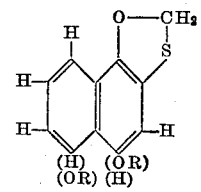

The preparation of these and other synergists are more fully described in the ensuing examples.

EXAMPLE 1

Preparation of naphth[2,1-d]-1,3-oxathiole 2-mercapto-1-naphthol is prepared by reduction of 1-naphthol-2-sulfonylchloride with lithium aluminum hydride or hydrogen iodide, followed by zinc-acetic acid, and is converted to the desired naphth[2,1-d]-1,3-oxathiole in the following manner: 2-mercapto-1-naphthol (3.53 gms.) in 50 grams freshly distilled dimethylformamide is charged to a reaction flash equipped with stirrer, heater, and nitrogen purge. To the solution is added 15 grams methyene bromide, then 14 grams potassium carbonate (anhydrous, granular) and the mixture heated to 65° C., where it is held for one and one-half hours. The resultant mixture is cooled, added to 250 grams water acidified with hydrochloric acid and the acidic solution extracted with hexane (50 ml. incrementally). The hexane extract is evaporated to yield a small amount of yellow oil identified by infrared spectroscopy, molecular weight and elemental analysis as naphth[2,1-d]-1,3-oxathiole. On passing a hexane solution of the oil through activated alumina followed by recovery of the product and careful crystallization, an off-white solid form of the product is obtained, melting at 45.5–47.5° C.

EXAMPLE 2

Preparation of naphth[1,2-d][1,3]oxathiole

Thiocyanation of 2-naphthol by conventional means (see for instance H. Tsukamoto, M. Hamana and M. Baba; J. Pharm. Soc. (Japan) 73 1083–6 (1953)) yields 2-oxo-naphth[1,2-d][1,3]oxathiole, which is converted directly to naphth[1,2-d]oxathiole by the following procedure: 2-oxo-naphth[1,2-d][1,3]oxathiole (40.0 gms.) is dissolved in 310 grams freshly distilled dimethylformamide and the solution charged under a blanket of nitrogen gas to a stirred, heated reaction vessel. Methylene bromide (69.06 gms.) and solid potassium hydroxide (66.0 gms.) are added, and the temperature raised to 65° C. over a period of about one hour. Nitrogen is maintained in the system at all times. After an additional one and one-half hours at 65° C., the mixture is cooled and added to 1500 grams water. Extraction of the resultant suspension with hexane (300 ml., incrementally) and subsequent evaporation of the hexane solvent yields 15–25 gms. of a heavy, pale yellow oil which is the desired naphth[1,2-d][1,3]oxathiole. The product may be purified further by passing its hexane solution through a colume of activated alumina prior to recovery.

EXAMPLE 3

Preparation of 8-methoxynaphth[1,2-d][1,3]oxathiole 2,7-naphthalenediol is etherified with slightly more than one equivalent of dimethylsulfate in methanolic potassium hydroxide solution. The base soluble portion of the product, 7-methoxy-2-naphthol (M.P. 117° C.), is treated with an excess of thiocyanogen in acetic acid solution at 15–25° C. for one half hour, then a large excess of water added, the pH adjusted to 7–8, and the resultant 2-amino-8-methoxynaphth[1,2-d][1,3]oxathiole filtered from solution. The solids are suspended in twenty times their weight of concentrated hydrochloric acid, and the suspension is heated to reflux for about four hours, or until the infrared spectrum of the solids shows complete hydrolysis to have occurred. Cooling and filtration gives 2-oxo-8-methoxynaphth[1,2-d][1,3]oxathiole. Treatment of this compound with methylenebromide and potassium hydroxide in dimethylformamide in the manner of Example 2 results after workup and extraction with n-hexane in a dense, pale yellow solid, M.P. 74–75.5° C., identified as 8-methoxynaphth[1,2-d][1,3]oxathiole.

EXAMPLE 4

Preparation of 7-methoxynaphth[1,2-d][1,3]oxathiole

The monomethyl ether of 2,6-naphthalenediol, thiocyanated in the manner of the preceding example, yields upon hydrolysis with boiling concentrated hydrochloric acid, 2-oxo-7-methoxynaphth[1,2-d][1,3]oxathiole. This compound, on methylenation with methylene bromide and potassium hydroxide, gives 7-methoxynaphth[1,2-d][1,3]oxathiole. The product is an off-white solid which fluoresces blue when pure.

EXAMPLE 5

Preparation of 8-(2-(2-ethoxyethoxy)ethoxy)naphth[1,2-d][1,3]oxathiole

Monothiocyanation of 2,7-naphthalenediol, followed by hydrolysis of the product with hot hydrochloric acid in the manner of the above examples, yields 2-oxo-8-hydroxynaphth[1,2-d][1,3]oxathiole. This compound on treatment with 2-(2-ethoxy)ethoxy ethylchloride (P. M. Frearson, D. G. Hardy and E. S. Stern, J. Chem. Soc. 1960, 2103.) in dimethylformamide at 85° C. in the presence of an excess of potassium carbonate gives 2-oxo-8-(2(2-ethoxy)ethoxy)ethoxynaphth[1,2-d][1,3]oxathiole, which upon methylenation in the manner of the above examples, yields 8-(2-(2-ethoxyethoxy)ethoxy)naphth[1,2-d][1,3]oxathiole as a hexane soluble pale yellow oil.

EXAMPLE 6

Preparation of 5-methoxynaphth[2,1-d][1,3]oxathiole 1,4-naphthalenediol is methylated with methanol and cold hydrochloric acid according to known procedures to give 4-methoxy-1-naphthol as the base soluble product (M.P. 130° C.). This compound is thiocyanated, the product hydrolyzed, and the hydrolysis product methylenated as in the previous examples to yield 5-methoxynaphth[2,1-d]-1,3-oxathiole as a pale yellow crystalline solid.

EXAMPLE 7

Preparation of 7-bromonaphth[1,2-d][1,3]oxathiole 6-bromo-2-naphthol prepared in the manner of Koelsch, Bachmann, and Kushner (Org. Syn. Coll. vol. 3, p. 132) is thiocyanated in glacial acetic acid, and the product hydrolyzed with concentrated hydrochloric acid to yield 2-oxo-7-bromo[1,2-d][1,3]oxathiole. This compound, methylenated in the manner heretofore described, gives 7-bromonaphth[1,2-d][1,3]oxathiole, M.P. 88–91° C.

EXAMPLE 8

Naphth[1,2-d][1,3]oxathiole-4-carboxylic acid 3-hydroxy-2-naphthoic acid is thiocyanated in acetic acid with free thiocyanogen in the usual manner, and the resultant 2-iminonaphth[1,2-d][1,3]oxathiole-4-carboxylic acid hydrolyzed with boiling concentrated hydrochloric acid to yield 2-oxo-naphth[1,2-d][1,3]oxathiole. This compound on methylenation according to the procedure of Example 2, at a temperature of 70–75° C., yields in substantially pure form naphth[1,2-d][1,3]oxathiole-4-carboxylic acid, a yellow solid, M.P. 227–230° C. (d).

EXAMPLE 9

Naphth[1,2-d][1,3]oxathiole-4-(2-(2-ethoxy)ethoxy)ethyl carboxylate

Naphth[1,2-d][1,3]oxathiole-4-carboxylic acid dissolved in ten times its weight of 2-(2-ethoxy)ethoxyethanol along with one equivalent of concentrated sulfuric acid and the mixture heated to boiling for ten minutes, gives, as the only base-insoluble, hexane-soluble product the ester, naphth[1,2-d][1,3]oxathiole-4-(2-(2-ethoxy)ethoxy)ethyl carboxylate, a viscous, pale yellow oil.

EXAMPLE 10

Naphth[1,2-d][1,3]oxathiole-4-n-butylcarboxamide

Naphth[1-2-d][1,3]oxathiole - 4 - carboxylic acid dissolved in an excess of thionyl chloride and allowed to stand overnight, the thionyl chloride removed under vacuum and the residue washed with petroleum ether, gives naphth[1,2-d][1,3]oxathiole-4-carboxyl chloride. Addition of the acid chloride to excess n-butylamine causes an exothermic reaction resulting, after addition to excess cold dilute mineral acid, in a yellow solid product, naphth[1,2-d][1,3]oxathiole-4-n-butylcarboxamide, M.P. 104–106° C.

EXAMPLE 11

7-hydroxynaphth-[1,2-d][1,3]oxathiole

In a scrupulously dried, nitrogen purged, vessel a solution of 3.2 grams 7-bromonaphth[1,2-d][1,3]oxathiole and 2.6 grams isopropyl bromide in 60 ml. anhydrous tetrahydrofuran is added incrementally (about ten portions over a period of about ten minutes) to a stirred suspension of 1.2 grams magnesium turnings in 10 ml. tetrahydrofuran. A crystal of iodine is added along with the first portion of solution, and the mixture warmed to about the reflux point at that stage to initiate reactions. As later portions of solution are added, reaction is maintained if necessary by further heating. When addition is completed the mixture is refluxed for three hours, then chilled with ice and dry, carbon-dioxide-free, oxygen gas introduced to displace the nitrogen. The mixture is stirred rapidly mechanically to promote absorption of oxygen and left under oxygen for at least two hours, then added to five times its volume of water, cooled with ice, and acidified with hydrochloric acid to dissolve all magnesium salts. The dark oil which separates from the aqueous mixture is extracted into methylene chloride, and the methylene chloride in turn extracted with ten percent aqueous sodium hydroxide solution. The basic solution is then acidified and the resultant precipitate collected by filtration, washed and dried. It may be recrystallized from hot water. 7-hydroxynaphth[1,2-d][1,3]oxathiole, M.P. 106–108° C.

EXAMPLE 12

Preparation of 8-hydroxynaphth[1,2-d][1,3]oxathiole 2,7-naphthalenediol is brought into reaction with one equivalent of free thiocyanogen in glacial acetic acid as solvent to yield 2-imino-8-hydroxynaphth[1,2-d][1,3]oxathiole. The reaction requires about one half hour. The product is isolated by dilution of the acetic acid with water, adjustment of the pH to about 7 with sodium hydroxide, and filtration. The imino compound is hydrolyzed by refluxing with an excess of concentrated hydrochloric acid for a period of about four hours, yielding 2-oxo-8-hydroxynaphth[1,2-d]oxathiole, a greenish yellow solid which is filtered from the acid suspension, washed with water, and thoroughly dried. The oxo compound, along with three equivalents of potassium hydroxide, is heated to about 75° C. in dimethylformamide solution until the disappearance of potassium hydroxide and appearance of a finer precipitate signals complete hydrolysis. This requires about one hour and should be done with complete exclusion of air. The mixture is cooled to about 30° C. and slightly more than one equivalent of methylene bromide added. An exothermic reaction occurs, and must be moderated to maintain the temperature below about 70° C. When heat is no longer generated, the mixture is warmed to 65–70° C. and held there for one half hour, then quenched with a large excess of water and acidified with mineral acid. The gummy solid which separates is removed from the aqueous solution by filtration or decanting. The gum is extracted repeatedly with boiling water and the clear aqueous solutions chilled with ice, whereupon the product, 8-hydroxynaphth-[1,2-d][1,3]oxathiole precipitates in pure form, M.P. 137–140° C.

EXAMPLE 13

Preparation of 5-methylnaphth[2,1-d]-1,3-oxathiole 4-methyl-1-naphthol, thiocyanated according to the herein described procedure, the product hydrolyzed to the corresponding 2-oxo-5-methylnaphth[2,1-d]-1,3-oxathiole and methylenated in the manner previously described, yields 5-methylnaphth[2,1-d]-1,3-oxathiole, a pale yellow, waxy solid.

EXAMPLE 14

Chloromethylnaphth[1,2-d][1,3]oxathiole

Naphth[1,2-d][1,3]oxathiole (30.0 grams) in 300 ml. glacial acetic acid is added to a solution prepared by dissolving 10.0 grams sym-trioxane in 250 ml. glacial acetic acid, followed by saturation with anhydrous hydrogen chloride. The total solution is then saturated with anhydrous hydrogen chloride while the temperature is maintained at 10–15° C. After about two and one half hours at this temperature a sample should show the reaction is substantially complete. If not, further saturation with hydrogen chloride is necessary. The product is isolated immediately upon completion of monochloromethylation in order to avoid substantial bis-substitution. Isolation is effected by quenching the solution in several volumes of water and filtration of the product. The product is substantially pure monochloromethylnaphth[1,2-d][1,3]oxathiole.

EXAMPLE 15

2-(2-butoxyethoxy)ethoxymethylnaphth[1,2-d][1,3]oxathiole

The product from the previous example, dissolved in more than ten times its own weight of 2-(2-butoxyethoxy)ethanol and treated with one equivalent of potassium hydroxide gives, after one hour's heating at 110° C., 2-(2-butoxyethoxy)ethoxymethylnaphth[1,2 - d][1,3]oxathiole as a hexane-soluble, pale yellow, viscous oil.

EXAMPLE 16

Preparation of 4-methoxynaphth[1,2-d][1,3]oxathiole 2,3-naphthalenediol, treated with one equivalent of free thiocyanogen in glacial acetic acid, and the product isolated and hydrolyzed in the manner of Example 12, yields 2-oxo-4-hydroxynaphth[1,2-d][1,3]oxathiole. This compound in methanolic solution with at least one equivalent of dimethylsulfate reacts, upon addition of one equivalent of potassium hydroxide in methanol at 0–5° C., to yield 2-oxo-4-methoxynaphth[1,2-d][1,3]oxathiole, which is methylenated in the previously described manner to give 4-methoxynaphth[1,2-d][1,3]oxathiole. The compound is a light yellow solid.

EXAMPLE 17

Preparation of 6-methoxynaphth[2,1-d]-1,3-oxathiole

This compound is obtained either from 1,5-naphthalenediol in the manner of the preceding example, or from 5-methoxy-1-naphthol in the manner of Example 3. It is a pale yellow solid.

EXAMPLE 18

Preparation of 8-octanoyloxynaphth[1,2-d][1,3]oxathiole and 8-(2-furoyl)oxynaphth[1,2-d][1,3]oxathiole 8-hydroxynaphth[1,2-d][1,3]oxathiole (Example 12) is esterified by treatment with a slight excess of octanoylchloride or 2-furoylchloride in pyridine solution at 25° C. for two hours, and the product isolated by addition of the solution to excess dilute mineral acid. 8-octanoyloxynaphth[1,2-d][1,3]oxathiole is a viscous, yellow liquid; 8-(2-furoyl)oxynaphth[1,2-d][1,3]oxathiole is a pale yellow solid, M.P. 124–125° C.

The oxathioles described and claimed herein show insecticide synergist activity comparable to that of the analogous dioxoles of our copending application previously referred to, and with the same classes of insecticides. Using as a sensitive test the carbamate carbaryl, i.e., 1-naphthyl-N-methylcarbamate (also known as "Sevin," a product of Union Carbide Corporation), as a typical organic toxicant, in a mixture of 5 parts by weight of one of the synergists listed above to 1 part of carbaryl, topical application in acetone solution to Naidm female (non-resistant) houseflies, showed that the insecticidal activity of carbaryl was increased from an $LD_{50}$ of about 900 micrograms per gram of flies (i.e., 900 μg./g.) to an $LD_{50}$ of the range 100 to 4.5 micrograms per gram of flies, that is, the activity is increased nine to two hundred fold depending upon the member of the family of oxathioles utilized as the synergist. Especially active synergists in combination with this toxicant are the unsubstituted, methoxylated, or brominated oxathioles, as shown by the following results:

| Synergist: | $LD_{50}$ as Sevin 5:1 wt./wt. Synergist Naidm female flies |
|---|---|
| (A) Naphth[2,1-d]-1,3-oxathiole | 6.0 |
| (B) Naphth[1,2-d][1,3]oxathiole | 4.5 |
| (C) 7-methoxynaphth[1,2-d][1,3]oxathiole | 4.9 |
| (D) 8-methoxynaphth[1,2-d][1,3]oxathiole | 4.6 |
| (E) 7-bromonaphth[1,2-d][1,3]oxathiole | 5.5 |
| (F) 5-methoxynaphth[2,1-d]-1,3-oxathiole | 6.5 |

Especially active in synergizing pyrethroids are the polyether derivatives of naphthoxathioles such as naphth[1,2-d][1,3]oxathiole - 4-(2-(2-ethoxy)ethoxy)ethylcarboxylate. Thus, spray tests with a formulation consisting of 0.25% of a purified pyrethrum extract containing 20% active pyrethrum, 2.50% naphth[1,2-d][1,3]oxathiole-4-(2-(2-ethoxy)ethoxy)ethylcarboxylate, 17.25% base oil (kerosene), and 80.00% mixed Freons showed 100% knockdown of flies in five minutes and 57% mortality in 24 hours. The same basic formulation, with 12.50% naphth[1,2 - d][1,3]oxathiole - 4-(2-(2-ethoxy)ethoxy)ethylcarboxylate showed 94% mortality of flies in 24 hours. Pyrethrum alone in the same formulation causes less than 10% mortality in 24 hours.

The naphthoxathioles, in the absence of ad hoc insecticidal substituents, appear to show no appreciable insecticidal activity in themselves, but act only in the presence of organic insect toxicants. The ratio of synergist to toxicant which may be used in practice can vary within wide limits, depending on the synergistic activity of the specific compound. Practically speaking, however, the ratio will lie within the range of 50:1 and 1:50, and generally between 10:1 and 1:10. The guiding principle for the use of naphthalenic oxathioles, however, is the employment of that amount and proportion of compound required to exhibit synergism when used in combination with a given insect toxicant.

In practice, as is customary, the toxicant-synergist mixtures may be formulated into wettable powders by the addition of powdered carriers of various sorts, such as bentonite, fuller's earth, and diatomaceous earth. A wetting agent may be included, and the admixture formulated into aqueous, emulsion, oil-base, and aerosol sprays, or in other standard ways. The synergist may be formulated apart from the toxicant, and these two essential components then applied at different times, in different ways and in various forms, if desired, provided that if the synergist and toxicant are applied at different times, the synergist must be applied first. Such formulations are considered a part of this invention. High molecular weight oligomers may be added to formulations in order to reduce the rate of evaporation of the synergist employed.

Such modifications of our invention as will naturally suggest themselves to one skilled in the arts involved are considered to be within the scope of our invention as limited only by the appended claims.

What is claimed is:

1. A compound selected from the group consisting of the 4-, 7- and 8-mono-methoxy ethers of naphth[1,2-d][1,3]oxathiole and the 5- and 6-mono-methoxy ethers of naphth[2,1-d]-1,3-oxathiole.
2. Naphth[2,1-d]-1,3-oxathiole.
3. Naphth[1,2-d][1,3]oxathiole.
4. 7-hydroxynaphth[1,2-d][1,3]oxathiole.
5. 8-hydroxynaphth[1,2-d][1,3]oxathiole.

References Cited

UNITED STATES PATENTS 3,436,403    4/1969    Cornforth ---------- 260—327

OTHER REFERENCES

Greenwood et al.: J. Chem. Soc. (1953), pp. 1514–15.

Laskina et al.: Chem. Abstracts, vol. 53 (1959), p. 17039.

JAMES A. PATTEN, Primary Examiner

U.S. Cl. X.R.

260—340.5, 454, 609, 613; 424—187, 188, 276, 300